US012052680B2

(12) United States Patent
Idnani et al.

(10) Patent No.: US 12,052,680 B2
(45) Date of Patent: *Jul. 30, 2024

(54) SIMPLE AND ASSISTED MECHANISM FOR REGISTERING AN INTERNET-OF-THINGS (IoT) DEVICE

(71) Applicant: TRANSFORM SR BRANDS LLC, Hoffman Estates, IL (US)

(72) Inventors: Ajaykumar R. Idnani, Hoffman Estates, IL (US); Lars Stig Sorensen, Algonquin, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,991

(22) Filed: Apr. 27, 2023

(65) Prior Publication Data
US 2024/0080789 A1 Mar. 7, 2024

Related U.S. Application Data

(63) Continuation of application No. 17/315,469, filed on May 10, 2021, now Pat. No. 11,683,776, which is a continuation of application No. 16/012,317, filed on Jun. 19, 2018, now Pat. No. 11,039,412.

(51) Int. Cl.
*H04W 60/04* (2009.01)
*H04L 67/125* (2022.01)
*H04W 4/02* (2018.01)
*H04W 8/20* (2009.01)
*H04W 48/08* (2009.01)
*H04W 76/27* (2018.01)
*H04W 88/16* (2009.01)
*H04W 92/02* (2009.01)

(52) U.S. Cl.
CPC ........... *H04W 60/04* (2013.01); *H04L 67/125* (2013.01); *H04W 4/02* (2013.01); *H04W 8/20* (2013.01); *H04W 48/08* (2013.01); *H04W 76/27* (2018.02); *H04W 88/16* (2013.01); *H04W 92/02* (2013.01)

(58) Field of Classification Search
CPC ....... H04W 84/12; H04W 48/16; H04W 4/80; H04W 8/005; H04W 4/70; H04W 12/06; H04W 12/50; H04W 12/08; H04W 88/16; H04W 4/50; H04W 60/00; H04W 76/10; H04W 12/00; H04L 67/12
See application file for complete search history.

(56) References Cited

U.S. PATENT DOCUMENTS

| 9,485,231 | B1 | 11/2016 | Reese |
| 10,064,062 | B2 | 8/2018 | Idnani et al. |
| 11,039,412 | B2 | 6/2021 | Idnani et al. |
| 2008/0004018 | A1 | 1/2008 | Adachi et al. |

(Continued)

OTHER PUBLICATIONS

Int'l Search Report and the Written Opinion Appln No. PCT/2019/037866 mailed Aug. 26, 2019.

(Continued)

*Primary Examiner* — Nam T Huynh
(74) *Attorney, Agent, or Firm* — McAndrews, Held & Malloy, Ltd.

(57) ABSTRACT

A method and system for automatically associating an Internet addressable endpoint device of an end-user with an account of the end-user at a remote system supporting a plurality of Internet addressable endpoint devices each associated with a respective end-user.

21 Claims, 10 Drawing Sheets

(56) References Cited

U.S. PATENT DOCUMENTS

| | | |
|---|---|---|
| 2013/0152167 A1 | 6/2013 | Park et al. |
| 2016/0055469 A1 | 2/2016 | Kim et al. |
| 2016/0294828 A1 | 10/2016 | Zakaria |
| 2017/0302669 A1 | 10/2017 | Chen et al. |
| 2019/0149530 A1 | 5/2019 | Ma |
| 2019/0230079 A1 | 7/2019 | Chung |

OTHER PUBLICATIONS

Int'l Preliminary Report on Patentability Appln No. PCT/2019/037866 mailed Dec. 30, 2020.

500

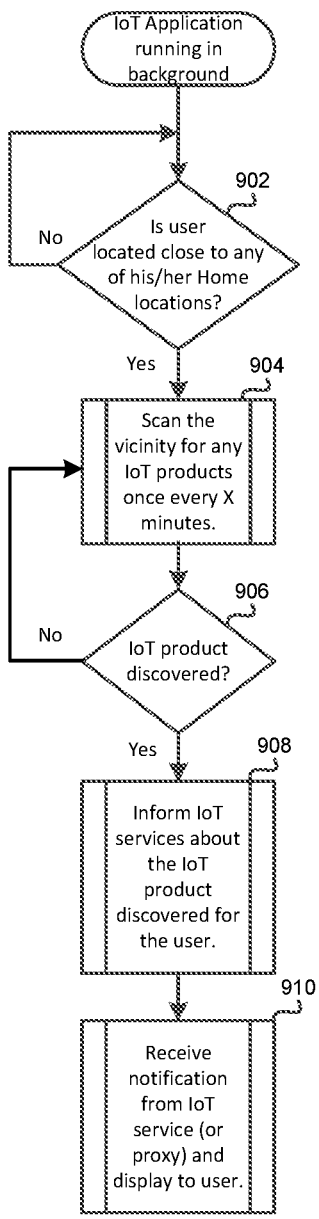
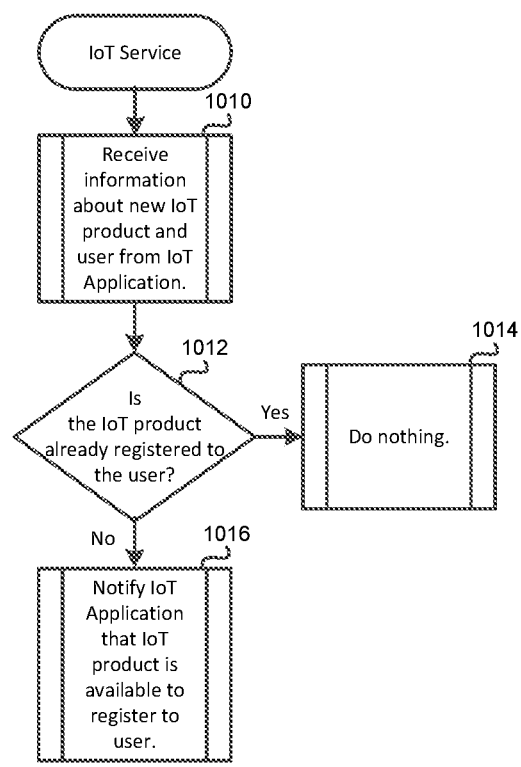
Fig. 9
Fig. 10

SIMPLE AND ASSISTED MECHANISM FOR REGISTERING AN INTERNET-OF-THINGS (IoT) DEVICE

CROSS-REFERENCE TO RELATED APPLICATIONS/INCORPORATION BY REFERENCE

The present application is a continuation of U.S. patent application Ser. No. 17/315,469, filed May 10, 2021, which is a continuation of U.S. patent application Ser. No. 16/012,317, filed Jun. 19, 2018 (now U.S. Pat. No. 11,039,412). Each of these applications is hereby incorporated herein by reference, in its entirety, for all purposes.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

A merchant of electrical appliances home may work with multiple manufacturers to build various Internet-connected appliances (i.e., IoT products or devices) to sell to their customers. In an Internet of Things (IoT) deployment, an end-user typically manually adds (e.g., "registers") new IoT devices to an end-user account with an IoT system of a service provider. The manual process of registering an Internet connected appliance typically consists of a number of steps that are repeated for each IoT device. Such a process is prone to human error. Registering multiple IoT devices from different manufacturers, with an IoT system, may involve the use of different registration mechanisms, which may make the registration process extremely cumbersome for the end-user. As a result, the end-user may either not register their IoT product, may find that the IoT device(s) are not properly registered to the end-user, an/or may feel a great deal of frustration when registration doesn't work or is as easy as expected.

Limitations and disadvantages of conventional methods and systems will become apparent to one of skill in the art, through comparison of such approaches with some aspects of the present methods and systems set forth in the remainder of this disclosure with reference to the drawings.

BRIEF DESCRIPTION OF SEVERAL VIEWS OF THE DRAWINGS

FIG. 9 shows a flowchart that illustrates actions of an example method by which an IoT application may scan for IoT products within RF communication range, even when the IoT application is running in the background, in accordance with various aspects of the present disclosure.

FIG. 10 is a flowchart illustrating an example method of operating an IoT service of an end-user device, in accordance with various aspects of the present disclosure.

SUMMARY

Figure 1:
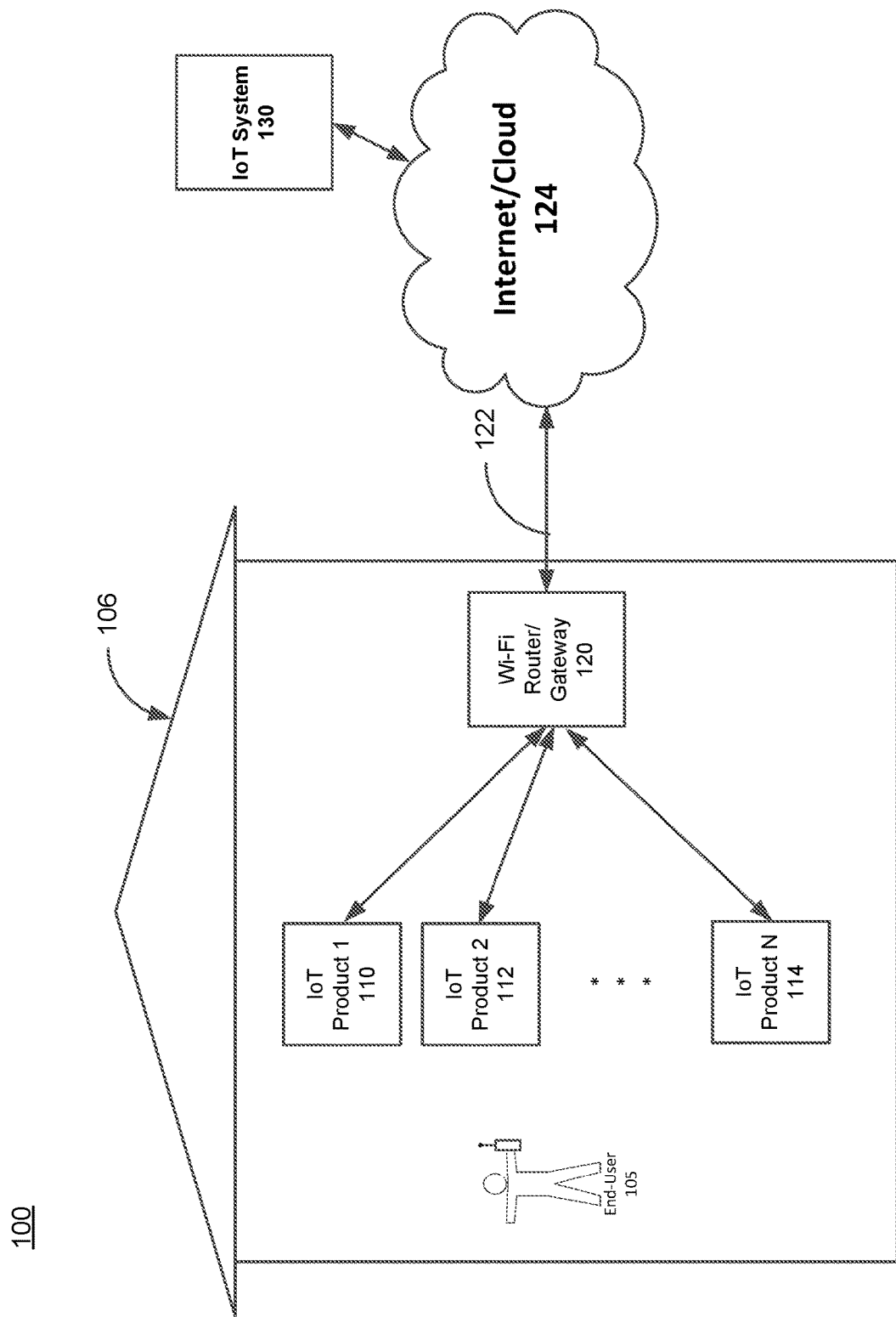
FIG. 1 is a simplified block diagram of the architecture of an Internet of Things, in accordance with various aspects of the present disclosure.

Various aspects of the present disclosure provide simple and assisted mechanisms for registering Internet-of-Things (IoT) devices with a remote IoT system, via a wireless network and the Internet.

DETAILED DESCRIPTION OF VARIOUS ASPECTS OF THE DISCLOSURE

The present application relates to the connection of end-user devices to a remote system via the Internet. More specifically, the present application relates to a simple and assisted mechanism for automatically registering various Internet-of-Things (IoT) devices in association with an end-user at a remote IoT system via the Internet. The term "Internet of Things" and the abbreviation "IoT" may be used herein to refer to the network of physical objects—devices, vehicles, buildings, and other items—embedded with electronics, software, sensors, and network connectivity that enables these objects to collect and exchange data via the Internet. Each IoT product/device may be an endpoint device having its own Internet address (e.g., IPv4, IPv6 address). The IoT allows objects to be sensed and controlled remotely across an existing network infrastructure (e.g., the Internet), creating opportunities for more direct integration of the physical world into computer-based systems.

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code, and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a device may be turned sideways so that its "top" surface is facing horizontally and its "side" surface is facing vertically, without departing from the teachings of the present disclosure.

A goal of the example registration processes described herein is to automatically discover one or more IoT devices/products within a particular vicinity and to prompt the end-user to perform device/product registration, based on the IoT devices/products discovered. In general, wirelessly connecting electrical appliances in a home to the Internet may involve configuring information for connecting to a wireless (e.g., Wi-Fi) access point (AP) or some other hub, based on the radio technology used. The example registration mechanism described herein remembers the configuration information of the wireless (e.g., Wi-Fi) AP or other radio technology hub, and uses that information to automatically configure new IoT products upon end-user consent/action, to register the IoT product to the end-user. Further details are provided below.

Various aspects of the present disclosure address problems that may be experienced by end-users attempting to make use of IoT devices/IoT-enabled products, by introducing a software application that the end-user may employ on one or more end-user devices such as, for example, smart phones, personal computers, and other electronic end-user devices equipped to communicate via wireless networks such as, for example, those compliant with one or more of the Wi-Fi wireless local/personal area network standards. Suitable Wi-Fi standards include, for example, IEEE 802.11a/b/g/ac/af, and suitable personal area network standards include, for example, the IEEE 802.15.3 personal area network (e.g., Bluetooth©) standard. The software application permits an end-user, via the end-user device, to register previously unregistered IoT products with an IoT system that may monitor and/or control the IoT products of the end-user. When active on the end-user device, the software application may continuously scan for IoT products within radio frequency communication range of the end-user device. The software application may act as a proxy on the end-user's behalf to automatically register compatible IoT devices/products with the account(s) of the end-user. The process of automatically registering IoT devices/products with an IoT system presents a number of challenges. Additional examples of information about such registration of IoT devices/products may be found, for example, in U.S. patent application Ser. No. 15/175,740, titled "System and Method for Automatically and Securely Registering an Internet of Things Device," filed Jun. 7, 2016, the complete subject matter of which is hereby incorporated herein, in its entirety, for all purposes.

It should be noted that while the term "house" may be used herein to refer to an example location, the use of that term does not represent a limitation of the present disclosure, as the inventive concepts discussed herein are applicable to other locations as well, including business location, etc., without departing from the scope of the present disclosure.

The following discussion describes a number of scenarios in which aspects of the present disclosure are used in alternative ways of registering an IoT device/product. The scenarios make reference to two different radio frequency (RF) technologies and two specific implementations that employ those technologies in example implementations. It should be noted that the inventive approaches described herein may be applied using other RF technologies and other implementations of the same or different RF technologies, without deviating from the scope and spirit of the present disclosure.

FIG. 1 is a simplified block diagram of the architecture of an Internet of Things 100, in accordance with various aspects of the present disclosure. The illustration of FIG. 1 includes a number of IoT products 1 110, 2 112, N 114 that are equipped to communicate wirelessly with a wireless (e.g., Wi-Fi, IEEE 802.11 a/b/g/n/ac/af)) router/gateway 120 located at a home 106. IoT products 1 110, 2,112, N 114 may comprise, by way of example and not limitation, home appliances (e.g., refrigerator, freezer, oven (microwave, convection, or conventional), dishwasher, washing machine, clothes dryer, garage door opener, robotic cleaning equipment, etc.), and/or home climate control components (e.g., furnace, air conditioner, humidifier, rooms fans, driveway heating, pool cleaning/heating/lighting components, etc.). IoT products 1 110, 2,112, N 114 may also comprise, by way of example and not limitation, home security devices (e.g., door locks, garage door opener, perimeter/interior/video security system, etc.), and/or home entertainment system components (e.g., televisions, digital video recorders/players, audio recording and/or playback equipment, etc.). The wireless router/gateway 120 is configured to manage transfer of digital information between the IoT products 1 110, 2 112, N 114 and an IoT system 130, via a suitable wired or wireless communication link 122 that may comprise, by way of example and not limitation, a cable-based media, broadband wireless, fiber optic, and/or digital subscriber loop (DSL) infrastructure and Internet/cloud 124. An end-user with electronic end-user device 105 is also illustrated. The end-user device 105 is equipped to wirelessly communicate (e.g., via one or more of Wi-Fi, IEEE 802.11 a/b/g/n/ac/af; IEEE 802.15.3 (e.g., Bluetooth©); and/or other suitable RF wireless communication technology) with the IoT products 1 110, 2 112, N 114 and the wireless router/gateway 120.

Figure 2:
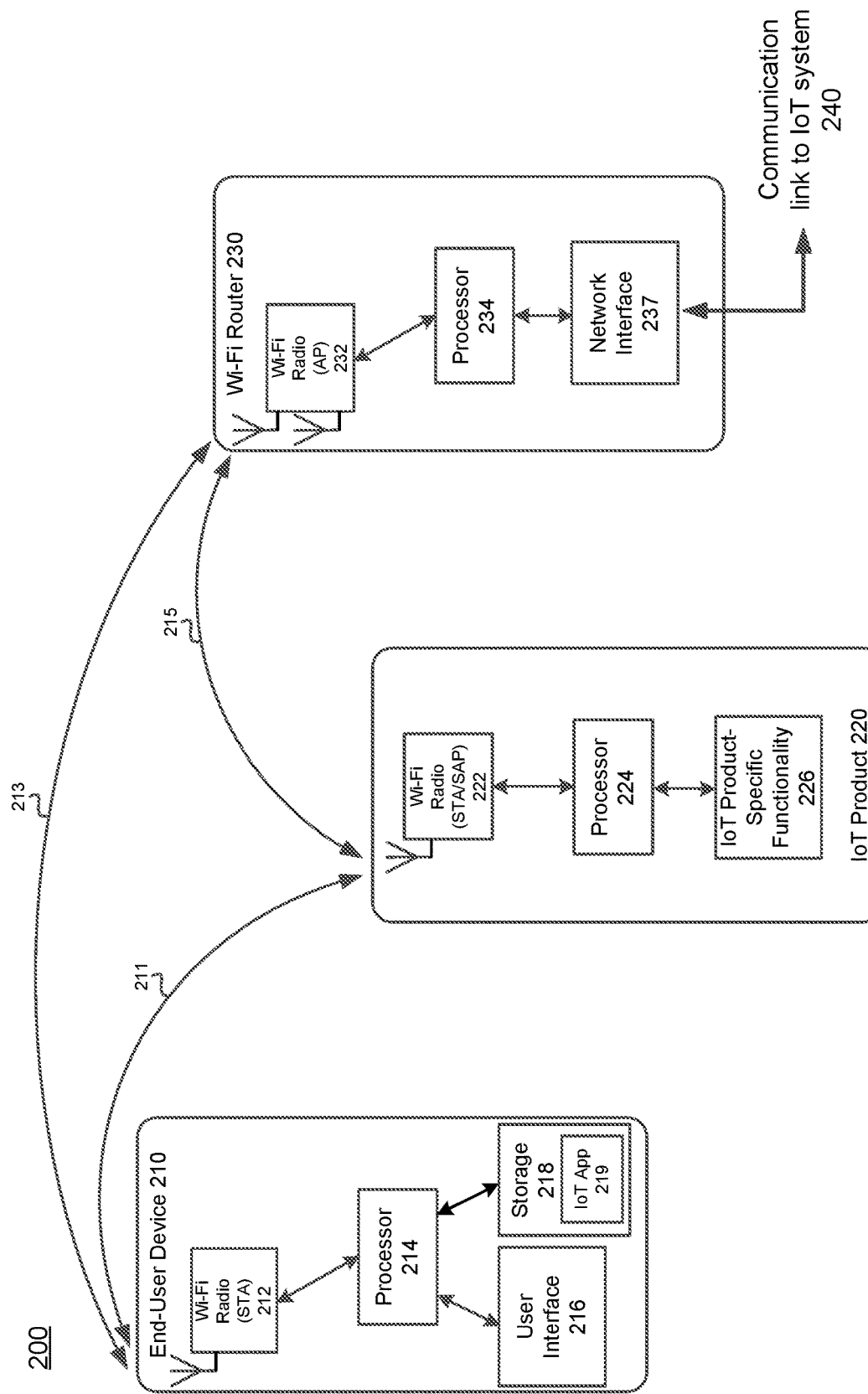
FIG. 2 is a block diagram illustrating example interaction and functionality of elements of an end-user device, an IoT product, and a wireless router/gateway communicating with an IoT system via a communication link in a first scenario, according to various aspects of the present disclosure.

FIG. 2 is a block diagram illustrating example interaction and functionality of elements of an end-user device 210, an IoT product 220, and a wireless router/gateway 230 communicating with an IoT system via a communication link 240 in a first scenario, according to various aspects of the present disclosure. The example end-user device 210, the IoT product 220, and the wireless router/gateway 230 of FIG. 2 may correspond to, for example, the end-user device 105; the IoT products 1 110, 2 112, N 114; and the wireless router/gateway 120, respectively, of FIG. 1. The communication link 240 may correspond to, for example, the communication link 122 and Internet/cloud 124 of FIG. 1.

The example end-user device 210 comprises one or more processor(s) 214, a user interface 216, storage 218 comprising IoT App 219, and a wireless RF interface (e.g., a Wi-Fi RF communication interface compliant with IEEE 802.11 a/b/g/n/ac/af) 212. The one or more processor(s) 214 may, for example, comprise a processor separate from the wireless RF interface 212, the circuitry of the user interface, and that of the storage 218, and may alternatively be together on a single or multiple circuit portions or devices, in any combination. The one or more processor(s) 214 may be configured to execute instructions accessed from the storage 218, including those of the IoT App 219, which may control the operation of the one or more processor(s) 214 and the wireless interface 212 according to various user inputs received via end-user input functionality of the user interface 216, and may provide status, guidance, and feedback to the end-user via output functionality of the user interface 216. The one or more processor(s) 214 may also take as input digital information received from wireless interface 212, and may produce digital information to be transmitted via the wireless interface 212. The example end-user device 210 may communicate digital information with the IoT product 220 via wireless communication link 211, and may communicate digital information with the wireless router/gateway 230 via wireless communication link 213. Although references to particular example wireless communication standard/recommendations are provided herein, other suitable wireless communication technologies may also be employed without departing from the spirit and scope of the present disclosure.

The example IoT product 220 comprises one or more processors 224, IoT product-specific functionality 226, storage 228 comprising IoT product software 229, and a wireless RF interface (e.g., a Wi-Fi RF communication interface compliant with IEEE 802.11 a/b/g/n/ac/af) 222. Like end-user device 210, the one or more processor(s) 224 may, for example, comprise one or more processors separate from the wireless RF interface 222, the circuitry of the IoT product-specific functionality 226, and the storage 228, but alternatively these functional elements may be integrated on a single or on multiple circuit portions or integrated circuit devices, in any combination. The one or more processor(s) 224 may be configured to execute instructions accessed from the storage 228, including those of the IoT product software 229, which may control the operation of the one or more processor(s) 224, the wireless interface 222, and the IoT product-specific functionality 226, according to various digital information received the IoT product-specific functionality and the wireless interface 222, and may produce digital information to be communicated to the IoT product-specific functionality and to be transmitted via the wireless interface 222. The IoT product software 229 may, for example, cause the one or more processor(s) 224 to receive and process status and sensor information from the IoT product-specific functionality 226, and cause the one or more processor(s) 224 to send status and control information to the IoT product-specific hardware. The example IoT product 220 may transfer digital information of various kinds to and from the IoT end-user device 210 via wireless communication link 211, and may also transfer digital information of various kinds to and from the wireless router/gateway 230, via wireless communication link 215.

The wireless router/gateway 230 of FIG. 2 may comprise any of a number of different wireless routers/gateways supporting, for the example shown in FIG. 2, a Wi-Fi compliant (e.g., IEEE 802.11a/b/g/n/ac/af) communication link enabling communication between the end-user device 210 and an IoT system via the wireless communication links 213, 240, and between the IoT product 220 and the IoT system via the wireless communication links 215, 240. Suitable wireless router/gateways include the LinkSys brand Wi-Fi compatible wireless routers from Belkin International, and wireless routers from NETGEAR®, to name only two of many examples.

In the example scenario illustrated in FIG. 2 and described above, the IoT product 220 to be registered with an IoT system (e.g., IoT system 130 of FIG. 1) is shown as a "Wi-Fi-only" IoT product, i.e., an IoT product that is only able to communicate using a Wi-Fi compliant, wireless interface protocol. For the purposes of this example, it is assumed that the IoT product 220 has never been registered before with an IoT system of the present disclosure. In such a situation, an IoT product acting as a Wi-Fi STA may, therefore, not be aware of access parameters needed to establish a connection through any Wi-Fi access points (APs) with which it might associate, and therefore does not know how to establish a connection to the Internet. In accordance with various aspects of the present disclosure, the IoT product 220 may instead begin operation in what is referred to herein as a "Soft AP mode." An IoT device such as the IoT product 220 that is able to operate in a "Soft AP mode" is able to temporarily behave as a wireless (e.g., Wi-Fi) access point, and to accept Wi-Fi associations from any Wi-Fi stations (STA) (e.g., the end-user device 210) that are within wireless communication range of the device operating in "Soft AP mode" (i.e., IoT product 220).

An IoT product/device operating in "Soft AP mode" may not know how to route traffic (e.g., to the Internet or to another IoT or other device), and may not be able to route traffic between two STAs connected to the IoT product/device operating in "Soft AP mode." An IoT product/device operating in "Soft AP mode" may, in its temporary role as an AP, broadcast (e.g., in a beacon or advertisement transmission) a Serving System Identifier (SSID) that is known, in whole or in part, to an IoT (software) application running on an end-user device, such as the IoT App 219 of the end-user device 210 of FIG. 2. An IoT application in accordance with aspects of the present disclosure may be a mobile application ("mobile app") running on an operating system of a mobile device platform such as, for example, the Android Operating System from Google, Inc., the iOS Operating System from Apple, Inc., the Windows® Operating System from Microsoft Corporation, the software platform of various Blackberry devices, or in general, a software application running on a computing platform of some sort. Also in accordance with aspects of the present disclosure, an IoT application may also be a "web application" that has access to the functionality of local (e.g., within wireless (e.g., Wi-Fi, Bluetooth®) communication range) computing and communication hardware (e.g., the computing and wireless (e.g., Wi-Fi, Bluetooth®, etc.) communication capabilities of a personal computer, tablet, laptop, smartphone, e-reader, or other suitable end-user electronic device). It should be note that a variant of the above approach may use a hub to communicate with the IoT application over the Internet. Such a variation is believed to be within the scope of this disclosure. The term "hub" may be used herein to refer to a network element similar in ways to a router. A hub may receive communications from IoT devices and communicate with the IoT system on behalf of the IoT devices.

Figure 3:
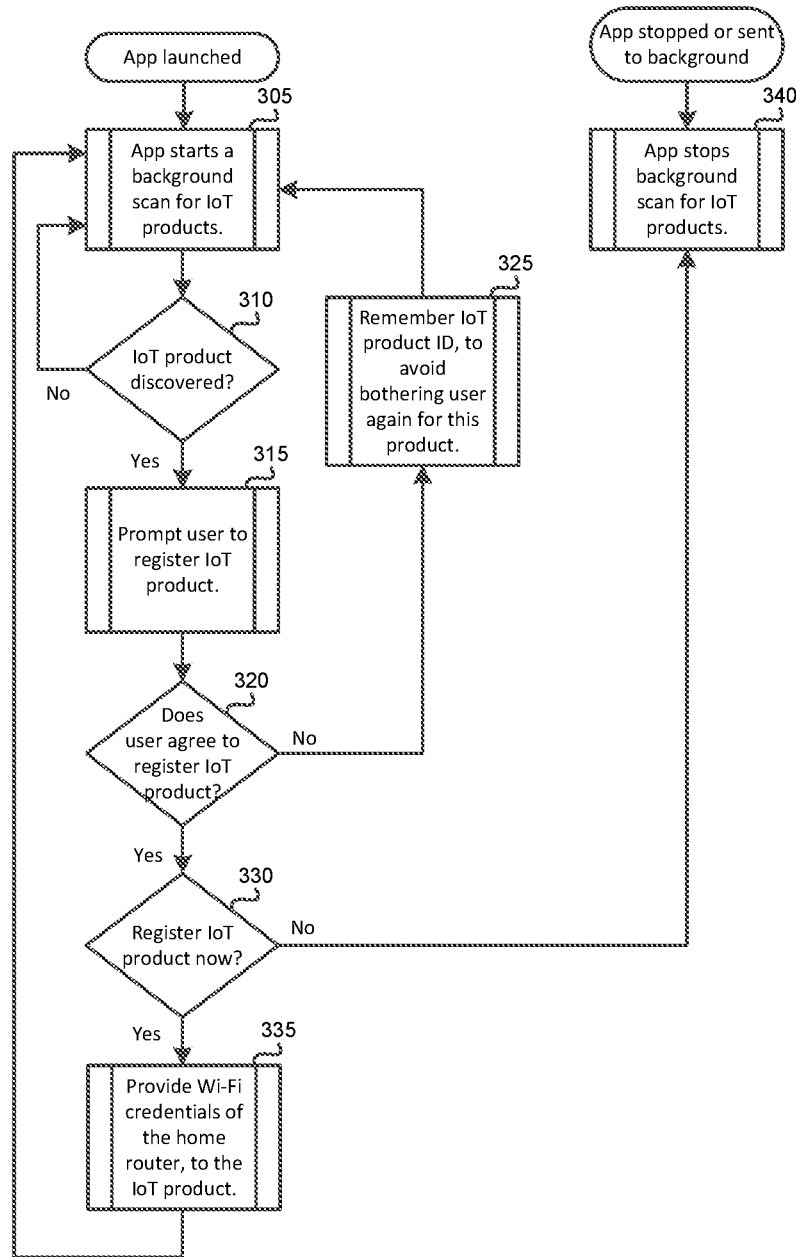
FIG. 3 shows a flowchart illustrating steps of an example method of using an IoT application of an end-user device to scan for, connect to, and register an IoT product/device with an IoT system, in accordance with aspects of the present disclosure.

FIG. 3 shows a flowchart illustrating steps of an example method of using an IoT application of an end-user device to scan for, connect to, and register an IoT product/device with an IoT system, in accordance with aspects of the present disclosure. The IoT system and the IoT product/device may correspond to the IoT system 130 and the IoT product 110 of FIG. 1, respectively. The following discussion of the actions of FIG. 3 may make reference to the elements of FIG. 2, described above. In particular, the IoT product 220 of FIG. 2 may correspond to the IoT product 110. The method of FIG. 3 begins at block 305.

At block 305 of FIG. 3, the IoT application running on an end-user device may, when launched, start a background scan that searches for RF signals (e.g., Wi-Fi, IEEE 802.11a/b/g/n/ac/af-compliant signals) carrying "known SSIDs," as described previously, above. At block 310, the method may determine whether signals received from any APs are detected to be carrying an SSID known, in whole or in part, to the IoT application of the end-user device running the IoT application. If, at block 310 the method determines that no signals received by the end-user device from any APs are carrying an SSID that, in part or whole, is known to the IoT application, the method returns to block 305, and continues scanning for known SSIDs. If, however, at block 310, the method of FIG. 3 determines that at least one AP is wirelessly broadcasting an RF signal carrying an SSID known, in part or whole, to the IoT application, the method performed by the end-user device then continues at block 315, where the IoT application may prompt the end-user to register the IoT product/device transmitting the known SSID while in "Soft AP mode." The prompt may, for example, be presented on a display of the end-user device, or may be played in audio to the user, and may say something like "Congratulations on buying your IoT product. Let's get you started and connect your IoT device to your home router." The method performed by the end-user device may then options to register the IoT product/device and set up a connection of the IoT product/device to an account of the end-user at an IoT system (e.g., IoT system 130). The display of the end-user device may provide a selectable option to permit the end-user to choose to set up a connection between the detected IoT product/device and the IoT system.

Next, at block 320, the method of FIG. 3 may determine whether the end-user agrees, in response to the prompt, to register a particular detected IoT product from which the known SSID was received, or has chosen to ignore/forget the detected IoT product completely. In accordance with aspects of the present disclosure, the end-user may, for example, choose to set up the particular the IoT product right away, or may ask the IoT application to note the existence of the particular IoT product and to later remind the end-user to register the particular IoT product. If, at block 320, the method determined that the end-user, in response to the prompt, has chosen to not register the particular IoT product and to ignore the presence of the particular IoT product, the method may proceed to block 325, where the method may store information identifying the particular IoT product, to avoid bothering the end-user should the particular IoT product be detected again at a later time. If, however, at block 320, the method determined that the end-user has decided to proceed with set up of the particular the IoT product, the method may then proceed to block 330, where the method may determine whether the end-user wishes to register the particular IoT product at the current time, or wait until later. If the end-user chooses not to proceed with set up of the particular the IoT product at the current time, the method may continue at block 340, where the method of the IoT application may stop background scanning for IoT products. If, however, at block 330, the end-user agrees to set up the particular IoT product, the IoT application may, at block 335, associate (e.g., initiate/establish a communication link) with the particular IoT product, and may provide to the particular IoT product, any credentials (e.g., security tokens/keys/information) needed for the particular IoT product to wirelessly access the home router/gateway as what may be referred to as a wireless station (e.g., for Wi-Fi, an STA). In accordance with various aspects of the present disclosure, the needed credentials may be provided to the IoT product by the IoT application, if those credentials were previously provided to the IoT application (e.g., during an earlier registration of another IoT device). If the IoT application does not have the needed credentials, the IoT application may ask the end-user to provide the credentials. At that point, the particular IoT product may switch from operating in a "Soft AP mode," to operating as a wireless station (e.g., in "Wi-Fi STA mode"), and may then connect to the home router/gateway using the credentials provided by the IoT application. It should be noted that, by switching the mode of the particular IoT product from "Soft AP mode" to "Wi-Fi STA mode," the IoT product also makes itself undiscoverable by other IoT applications in the vicinity. In this innovative manner, the IoT application may automatically detect the presence of IoT products within wireless communication range and may lead the end-user through a guided registration process.

Figure 4:
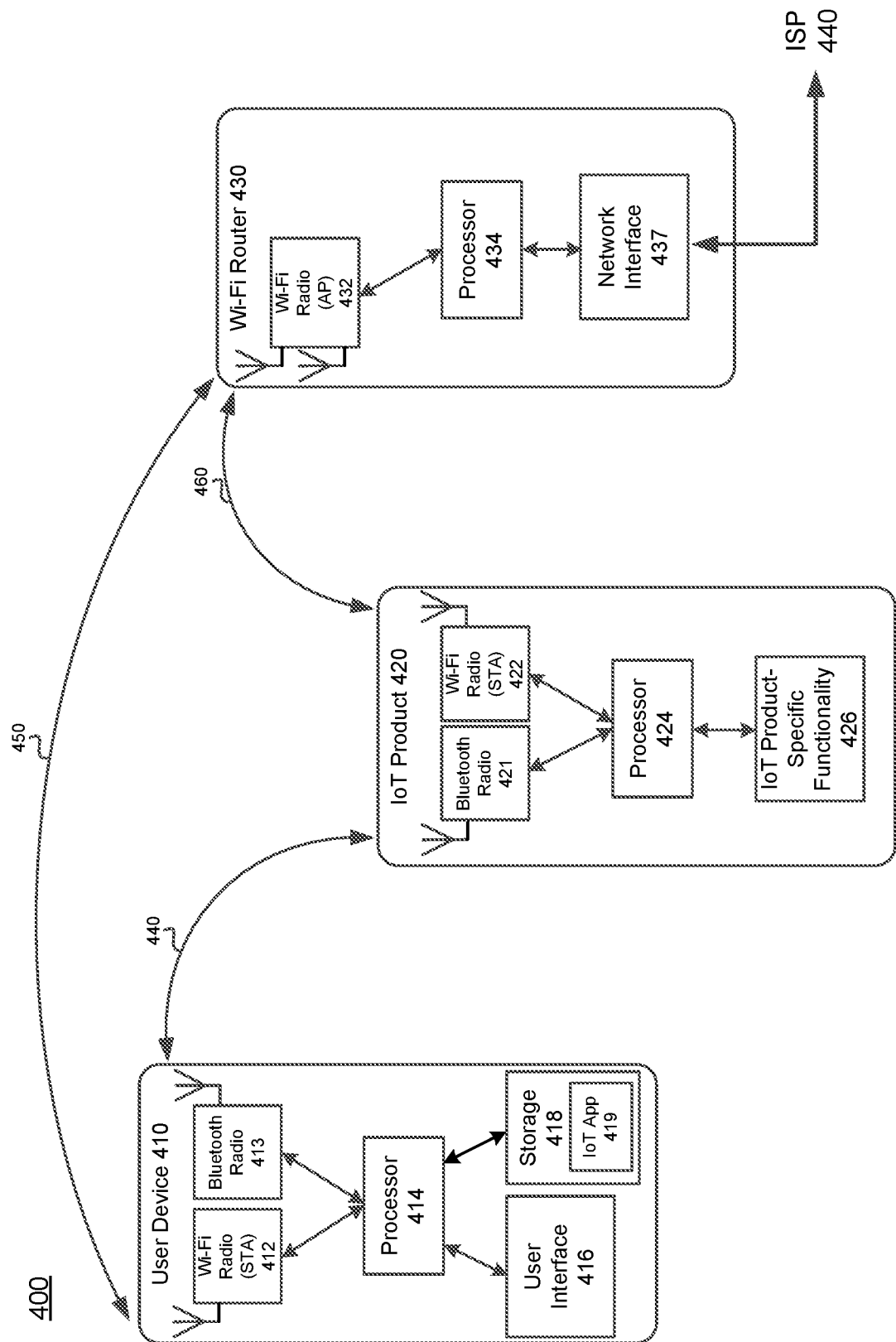
FIG. 4 is a block diagram illustrating example interactions and functionality of elements of an end-user device, an IoT product, and a wireless router/gateway communicating with an IoT system via a communication link in a second scenario, in accordance with various aspects of the present disclosure.

FIG. 4 is a block diagram illustrating example interactions and functionality of elements of an end-user device 410, an IoT product 420, and a wireless router/gateway 430 communicating with an IoT system via a communication link 440 in a second scenario, in accordance with various aspects of the present disclosure. The example end-user device 410, the IoT product 420, and the wireless router/gateway 430 of FIG. 4 may correspond to, for example, the end-user device 105; IoT product 1 110, 2 112, N 114; and wireless router/gateway 120, respectively, of FIG. 1, and are similar in various aspects to the end-user device 210, the IoT product 220, and the wireless router/gateway 230 of FIG. 2, respectively, additional details of which are discussed below. The communication link 440 may correspond to, for example, the communication link 122 and Internet/cloud 124 of FIG. 1, respectively, and may be similar in various ways to the communication link 240 of FIG. 2.

The example end-user device 410 comprises one or more processor(s) 414, a user interface 416, storage 418 comprising IoT App 419, a first, relatively longer range wireless (e.g., RF) interface (e.g., a Wi-Fi RF communication interface compliant with IEEE 802.11 a/b/g/n/ac/af) 412, and a second, relatively shorter range wireless (e.g., RF) interface (e.g., IEEE 802.15.3 (personal area network such as Bluetooth®) 413. The one or more processor(s) 414 may, for example, comprise a one or more processors separate from the wireless RF interface 412, the wireless RF interface 413, the circuitry of the user interface, and the circuitry of the storage 418, and may alternatively be located together on a single or multiple circuit portions or devices, in any combination. The one or more processor(s) 414 may be configured to execute instructions accessed from the storage 418, including those of the IoT App 419, which may control the operation of the processor 414, the wireless RF interface 412, and the wireless RF interface 413, according to various user inputs received via end-user input functionality of the user interface 416, and may provide status, guidance, and/or feedback to the end-user via output functionality of the user interface 416. The processor 414 may also take as input, digital information received from the wireless interface 412, the wireless interface 413, and may produce digital information to be transmitted via the wireless interface 412 and/or the wireless interface 413. The example end-user device 410 may communicate digital information with the IoT product 420 via wireless communication link 440, and may communicate digital information with the wireless router/gateway 430 via wireless communication link 450. Although references to particular example wireless communication standard/recommendations are provided herein, other suitable wireless communication technologies may also be employed without departing from the spirit and scope of the present disclosure.

The example IoT product 420 comprises one or more processor(s) 424, IoT product-specific functionality 426, storage 428 comprising IoT product software 429, a first, relatively longer range wireless (e.g., RF) interface (e.g., a Wi-Fi RF communication interface compliant with IEEE 802.11 a/b/g/n/ac/af) 422, and a second, relatively shorter range wireless (e.g., RF) interface (e.g., IEEE 802.15.3 (a personal area network such as Bluetooth®—classic or BLE)) 421. Like end-user device 410, the one or more processor(s) 424 may, for example, comprise one or more processors separate from the wireless RF interface 421, the wireless RF interface 422, the circuitry of the IoT product-specific functionality 426, and the storage 428, but alternatively these functional elements may be integrated on a single or multiple circuit portions or integrated circuit devices, in any combination. The one or more processor(s) 424 may be configured to execute instructions accessed from the storage 428, including those of the IoT product software 429, which may control the operation of the one or more processor(s) 424, the two wireless interfaces 421, 422, and the IoT product-specific functionality 426, according to various digital information received from the IoT product-specific functionality and the wireless interfaces 421, 422, and may produce digital information to be communicated to the IoT product-specific functionality 426 and to be transmitted via the two wireless interfaces 421, 422. The IoT product software 429 may, for example, cause the one or more processor(s) 424 to receive and process status and sensor information from the IoT product-specific functionality 426, and cause the one or more processor(s) 424 to send status and control information to the IoT product-specific functionality 426. The example IoT product 420 may directly transfer digital information of various kinds to and from the end-user device 410 via the wireless communication link 440. In addition, the IoT product 420 may transfer digital information of various kinds to and from the end-user device 410 via the wireless communication link 460, the wireless router/gateway 430, and the wireless communication link 450. The IoT product 420 may also transfer digital information of various kinds to and from the end-user device 410 via the wireless communication link 460, the wireless router/gateway 430, the ISP 440 and the Internet, and the wireless communication link 450.

The wireless router/gateway 430 of FIG. 4 may comprise any of a number of different wireless routers/gateways supporting, for the example shown in FIG. 4, Wi-Fi compliant (e.g., IEEE 802.11a/b/g/n/ac/af) communication link enabling communication between the end-user device 410 and an IoT system via the wireless communication links 450 and ISP 440, and between the IoT product 420 and the IoT system via the wireless communication links 460 and ISP 440. Suitable wireless router/gateways include LinkSys® brand Wi-Fi compatible wireless routers from Belkin International, and wireless routers from NETGEAR®, to name only two of many possible examples.

The example scenario illustrated in FIG. 4, whose elements are described above, is similar in many ways to the illustration of FIG. 2, with the exception that the IoT product 420 of FIG. 4 uses two wireless interfaces that communicate using different wireless communication technologies. In the example of FIG. 4, the IoT product 220 to be registered with an IoT system (e.g., IoT system 130 of FIG. 1) is shown as being what is referred to herein as a "dual-radio" IoT product, in which the IoT product has at least a relatively shorter range RF wireless communication technology such as, for example, IEEE 802.15.3 (which may also referred to as Bluetooth®) that is used for local communication with the end-user device with the IoT application, and a relatively longer range RF wireless communication technology such as, for example, IEEE 802.11a/b/g/n/ac/af (which may be referred to herein as "Wi-Fi") that may be used for longer-distance communication with the IoT application running on the end-user device, and with the Internet. It should be noted that the RF communication technologies used in the "dual-radio" approach may be other than those discussed in the examples presented herein including, for example, cellular (e.g., 3G, 4G, 5G, Long Term Evolution (LTE), Code Division Multiple Access (CDMA), Time Division Multiple Access (TDMA), Global System for Mobile Communication (GSM), or other suitable cellular standard), wideband, or other RF wireless technology.

In accordance various aspects of the present disclosure, a "dual radio" IoT product (e.g., IoT product 420) may broadcast advertisements using a first wireless RF interface (e.g., a Bluetooth® radio). The advertisements may comprise information that enables an IoT application in an end-user device (e.g., IoT app 419 of end-user device 410) to identify the IoT product. For example, the advertisement transmitted by the IoT product may contain an indicator (e.g., a universally unique identifier (UUID)) some or all of which identifies the IoT product or a specific service being provided by the IoT product that broadcast the advertisement including, for example, data specific to the manufacturer of the IoT product such as data that identifies the manufacturer of the IoT product, that identifies the IoT Product model, that identifies the IoT product hardware and/or software version, and/or a serial number of the IoT product. Receipt of the advertisement(s) by the IoT application of and end-user device is an indication that there are one or more IoT products in the vicinity of the IoT application running on the end-user device.

Registration of a "dual radio" IoT product in accordance with various aspects of the present disclosure may happen in a manner similar to that described above with regard to FIG. 2 and FIG. 3. When an IoT application of an end-user device (e.g., IoT app 419 of end-user device 410 of FIG. 4) is launched, the IoT application may begin scanning RF spectrum using the relatively shorter range RF communication interface (e.g., a Bluetooth® radio) of the "dual radio" arrangement, to detect the presence of compatible IoT products within wireless communication range of the end-user device, and to receive and decode any advertisements being transmitted by such IoT products. When the end-user device receives from an IoT product an advertisement that contains an indicator, such as that described above, that identifies an IoT product as one that is compatible with the IoT application, the IoT application may then, in response, prompt the user with a message like "Congratulations on buying your IoT product. Let's get you started and connect your IoT product to your home router." The IoT application may also provide an option to the end-user to register the IoT product with an IoT system. The end-user may decide to go ahead with connecting and registering the IoT product, may ask to be reminded at a later point in time, or may ask the IoT application to ignore/forget the detected IoT product completely. If the end-user indicates that the IoT product is to be ignored, the IoT application may remember that end-user's preference, so that the end-user is not bothered with further reminders about connecting/registering the IoT product. If, however, the end-user agrees to connect the IoT product with the home router/gateway and/register the IoT product with the IoT system, the IoT application of the end-user device may connect to the IoT product using the relatively shorter range RF communication interface (e.g., Bluetooth®) and may provide to the IoT product, the credentials for the home router/gateway (e.g., a Wi-Fi router such as the router/gateway 430 of FIG. 4). At this point, the IoT product may enable operation of the relatively longer range RF communication interface (e.g., a Wi-Fi radio) of the "dual radio" approach, may connect to the home router/gateway using the credentials provided to the IoT application of the end-user device by the IoT application, and may register the IoT product with an IoT system (e.g., IoT system 130 of FIG. 1) via an Internet service provider such as ISP 440 of FIG. 4. In this way, the IoT application of an end-user device may automatically detect the presence of compatible IoT products in the vicinity of the end-user device, and may lead the end-user through a guided connect/registration process.

This second scenario is similar in many ways to the first scenario described with regard to FIGS. 2 and 3. The fundamental difference is that two radios employing different RF wireless technologies operating over different radio frequency protocols are employed in scenario 2. This provides an illustrative example of different radio frequency technologies that may be employed in a multi-radio solution, without departing from the spirit and scope of the present disclosure. The dual-radio approach provides a different mechanism by which the end-user may register an IoT product. In a single radio implementation in accordance with aspects of the present disclosure, the registration process may involve the end-user pressing a button on the IoT device, to place the IoT device in the "Soft AP mode". This may be desirable for reasons of security rather than technical reasons. The use of a button press by the end-user helps to prove ownership of the IoT product by the end-user. In a similar fashion in the dual radio case, the fact that the end-user is within the limited range of a Bluetooth® signal of the IoT product during registration provides proof of ownership to some extent. In addition, aspects of the present disclosure may employ end-user scanning of an optical code (e.g., QR code) on a printed label of the IoT product as proof of ownership.

Figure 5:
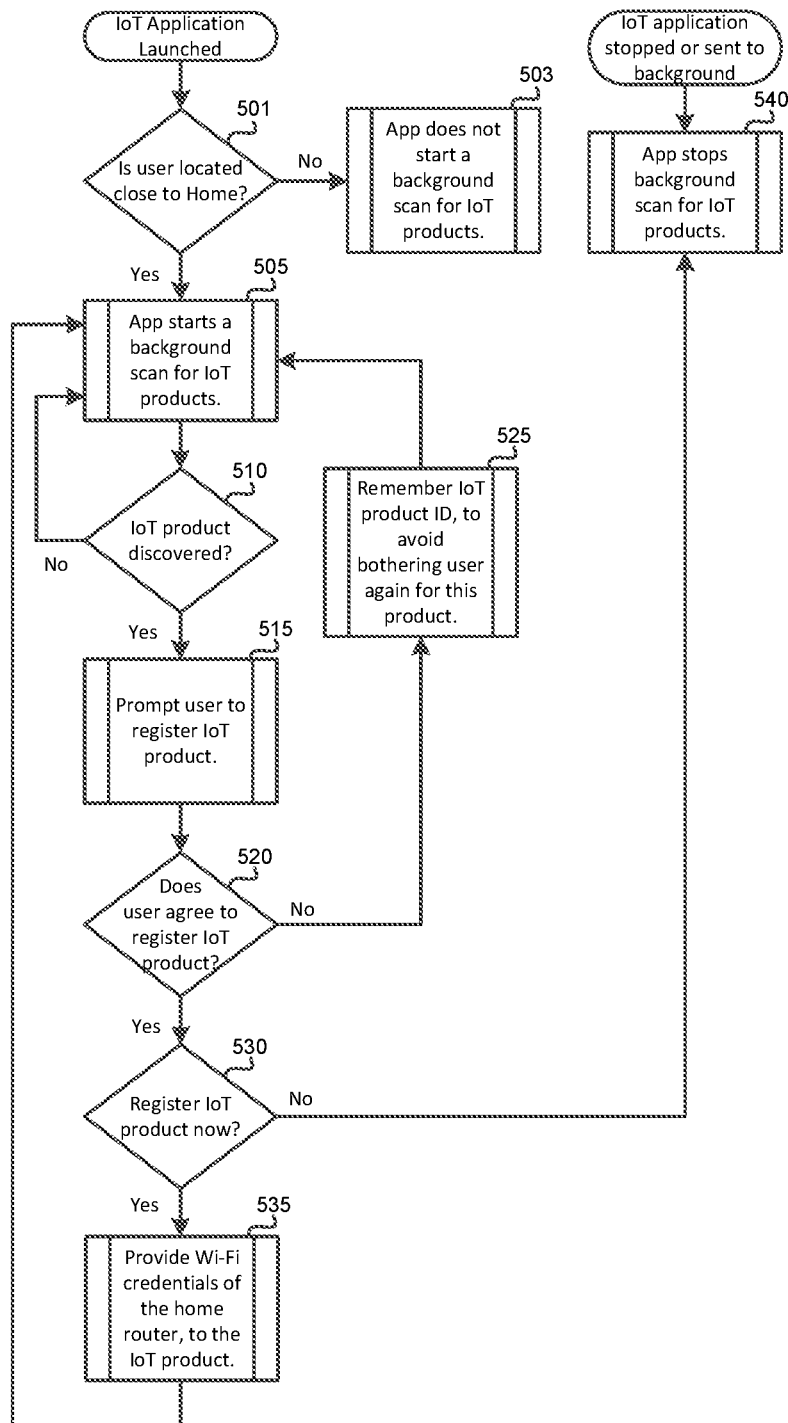
FIG. 5 shows a flowchart illustrating the steps of another example method of using a IoT application of an end-user device to scan for, connect to, and register an IoT product/device with an IoT system, in accordance with aspects of the present disclosure.

FIG. 5 shows a flowchart illustrating the steps of another example method of using a IoT application of an end-user device to scan for, connect to, and register an IoT product/device with an IoT system, in accordance with aspects of the present disclosure. The method illustrated in FIG. 5 is similar in many respects to the method shown in FIG. 3, and the sequence of the actions of blocks numbered 505 through 540 of FIG. 5 may correspond to sequence of actions of blocks 305-340 of FIG. 3. The method of FIG. 5 begins at block 501.

At block 501, the method of FIG. 5 directs the end-user device running the IoT application (e.g., end-user device 410 with IoT application 419) to determine whether the end-user device is "close to" (e.g., located within a certain threshold physical distance of) a geographic/physical location (e.g., latitude/longitude) of a location (e.g., home/business) designated by the end-user. Such a determination may be made using any of a number of geolocation techniques including, for example, determining the geographic/physical location of the end-user device using a Global Navigation Satellite System (GNSS) such as the Global Positioning System (GPS), using elements of a cellular communication infrastructure, and/or using a geolocation approach that employs "wireless fingerprinting." If, at block 501, the method determines that the end-user device is "close to" the designated location of the end-user, the method of FIG. 5, at block 501, may elect to proceed to block 505, where the method may direct the end-user device to begin a background scan for compatible IoT products. The method may then proceed to perform the actions defined by blocks 505 through 540, which may correspond to blocks 305-340 of FIG. 3. If, however, the method determines, at block 501, that the end-user device is not "close to" the designated location of the end-user, the method of FIG. 5, at block 501, may elect to proceed to block 503, where the method may not direct the end-user device to perform a background scan for compatible IoT products, and the method of FIG. 5 may end. In this manner, the IoT application may avoid notifying the end-user about compatible IoT products that belong to/are associated with other end-users, when the end-user moves about their daily activities. Depending upon the range of the wireless technology used for the communication between the IoT application of the end-user device and nearby IoT products, this may avoid having the IoT application present annoying notifications to the end-user as the end-user moves about residential and business locations where numerous compatible IoT products of others may be present. It should be noted that the action of block 501 may be repeated, at a regular or irregular interval of time, to determine whether a scan for compatible IoT products should be performed.

Figure 6:
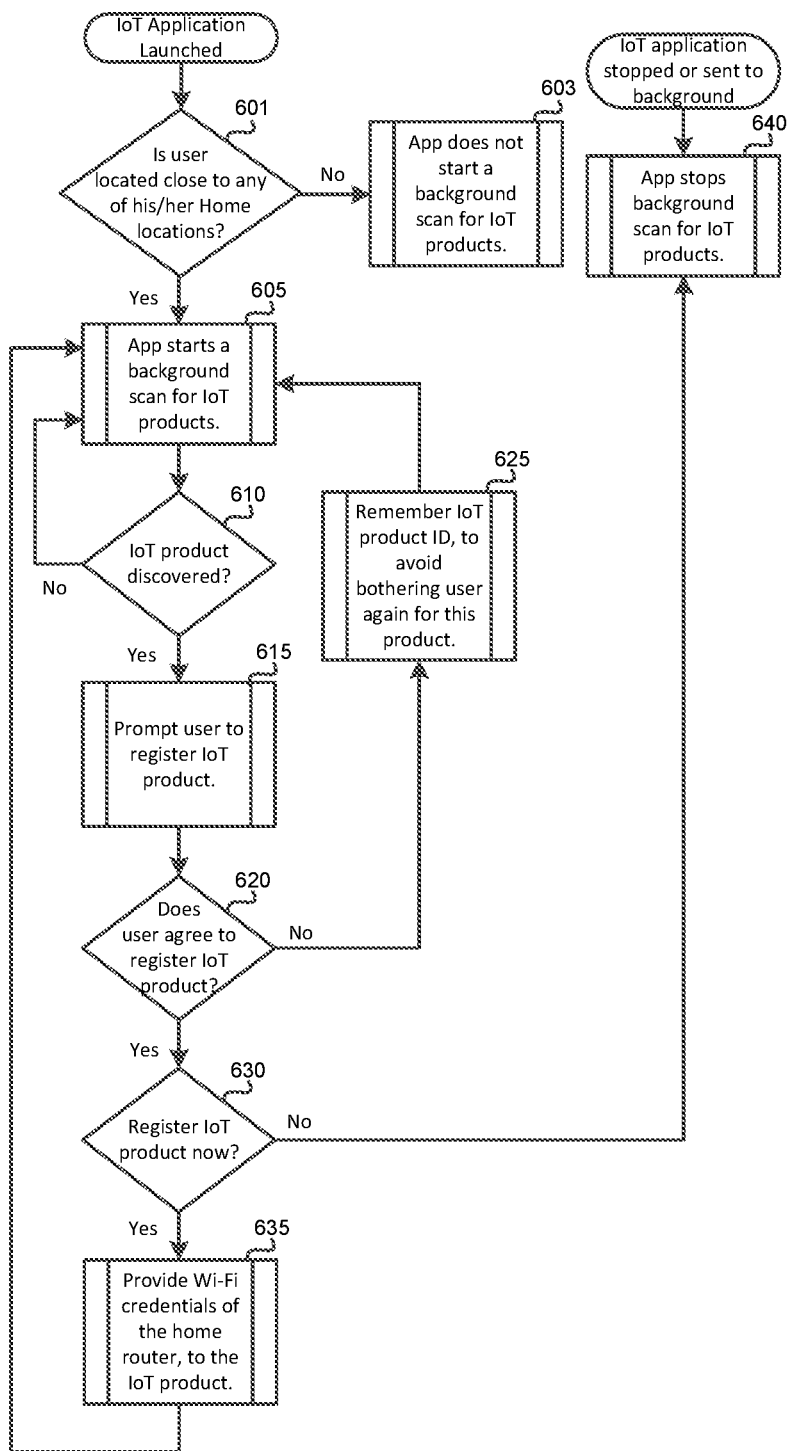
FIG. 6 shows a flowchart illustrating the steps of a further example method of using an IoT application of an end-user device to scan for, connect to, and register an IoT product/device with an IoT system, in accordance with aspects of the present disclosure.

FIG. 6 shows a flowchart illustrating the steps of a further example method of using an IoT application of an end-user device to scan for, connect to, and register an IoT product/device with an IoT system, in accordance with aspects of the present disclosure. The method illustrated in FIG. 6 is similar in many respects to the methods shown in FIG. 3 and FIG. 5, and the sequence of the actions of blocks numbered 605 through 640 of FIG. 6 may correspond to the sequence of actions of blocks 305-340 of FIG. 3, or of blocks 505-540 of FIG. 5. The method of FIG. 6 begins at block 601.

At block 601, the method of FIG. 6 may direct the end-user device running the IoT application (e.g., end-user device 410 with IoT application 419) to determine whether the end-user device is "close to" (e.g., located within a certain threshold physical distance of) any of a number of geographic/physical locations (e.g., identified by latitude/longitude) of locations (e.g., homes/businesses/etc.) designated by the end-user. Such a determination may be made using any of the example geolocation techniques identified herein. If, at block 601, the method determines that the end-user device is "close to" one of the locations designated by the end-user, the method of FIG. 6, at block 601, may elect to proceed to block 605, where the method may direct the end-user device to begin a background scan for compatible IoT products. The method may then proceed to perform the actions the actions defined by blocks 605 through 640, which may correspond to blocks 305-340 of FIG. 3 or to blocks 505-540 of FIG. 5. If, however, the method determines, at block 601, that the end-user device is not "close to" any of the locations designated by the end-user, the method of FIG. 6, at block 601, may elect to proceed to block 603, where the method may not direct the end-user device to perform a background scan for compatible IoT products, and the method of FIG. 6 may end. In this manner, the IoT application may avoid notifying the end-user about compatible IoT products only at designated locations, when the end-user moves about their daily activities. Depending upon the range of the wireless technology used for the communication between the IoT application of the end-user device and nearby IoT products, this may avoid having the IoT application present annoying notifications to the end-user as the end-user moves about residential and business locations where numerous compatible IoT products of others may be present. It should be noted that the action of block 601 may be repeated, at a regular or irregular interval of time, to determine whether a scan for compatible IoT products should be performed.

Figure 7:
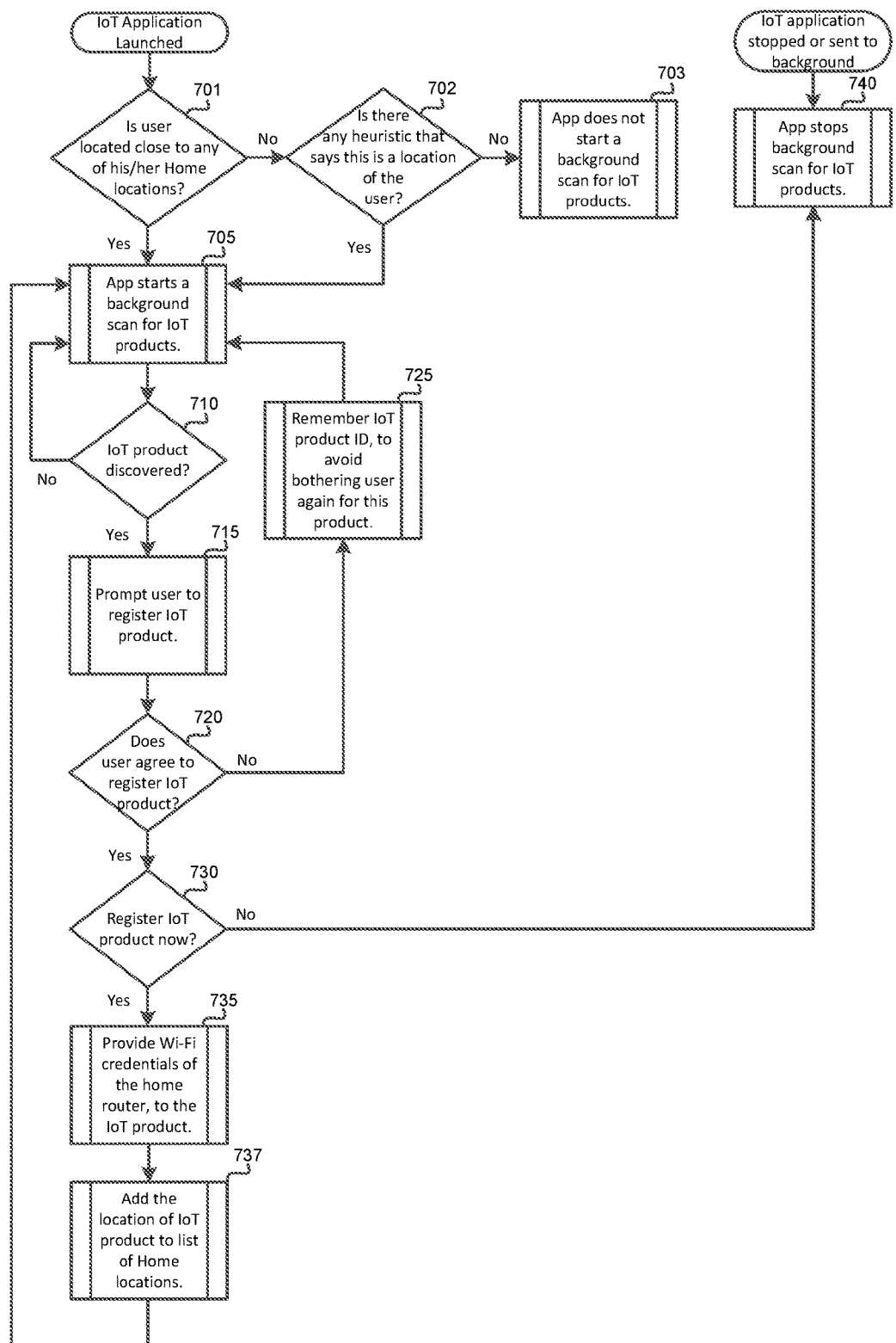
FIG. 7 shows a flowchart illustrating the steps of yet another example method of using an IoT application of an end-user device to scan for, connect to, and register an IoT product/device with an IoT system, in accordance with aspects of the present disclosure.

FIG. 7 shows a flowchart illustrating the steps of yet another example method of using an IoT application of an end-user device to scan for, connect to, and register an IoT product/device with an IoT system, in accordance with aspects of the present disclosure. The method illustrated in FIG. 7 is similar in many respects to the methods shown in FIGS. 3, 5, and 6, and the sequence of the actions of blocks numbered 705 through 740 of FIG. 7 may, for the most part, correspond to the sequence of actions of blocks 305-340 of FIG. 3, of blocks 505-540 of FIG. 5, and of blocks 605-640 of FIG. 6. There are some differences from the example embodiments discussed above, including additional actions of block 702 and block 737, which are described below. The method of FIG. 7 begins at block 701.

As in FIG. 6 at block 601, block 701 of the method of FIG. 7 directs the end-user device running the IoT application (e.g., end-user device 410 with IoT application 419) to determine whether the end-user device is "close to" (e.g., located within a certain threshold physical distance of) any of a number of geographic/physical locations (e.g., identified by latitude/longitude) of locations (e.g., homes/businesses/etc.) designated by the end-user. Such a determination may be made using any of the example geolocation techniques identified herein. If, at block 701, the method determines that the end-user device is "close to" one of the locations designated by the end-user, the method of FIG. 7, at block 701, may elect to proceed to block 705, where the method may direct the end-user device to begin a background scan for compatible IoT products. The method may then proceed to perform the actions the actions defined by blocks 705 through 740 that may, for the most part, correspond to the actions of blocks 305-340 of FIG. 3 or to the actions of blocks 505-540 of FIG. 5. If, however, the method determines, at block 701, that the end-user device is not "close to" any of the locations designated by the end-user, the method of FIG. 7, at block 701, may elect to proceed to block 702, where the method may determine whether there are any heuristics available to the method that indicate that the current geographic/physical location is a location at which the end-user may have IoT products that may need to be registered. For example, the IoT application may "learn" about the end-user's location over a period of time of usage of the end-users device and IoT application. In accordance with aspects of the present disclosure, such learning may be based on certain heuristics such as, for example, the frequency of end-user visits to a particular or current location, the determination that the end-user possessed one or more registered IoT products at a particular or current location, etc. If, at block 702, the method determines that there are no heuristics that indicate that the current any particular geographic/physical location is a location at which the user may have IoT products that may need to be registered, the method may proceed to block 703, where the method may not direct the end-user device to perform a background scan for compatible IoT products, and the method of FIG. 7 may end as in the examples discussed above. However, if at block 702, the method determines that there is at least one heuristic that indicates that the current or a particular geographic/physical location is a location at which the user may have IoT products that may need to be registered, the method may proceed to block 705, described above. In this manner, the IoT application may notify the end-user about compatible IoT products at certain designated locations associated with the end-user, when the end-user moves about their daily activities, but may also use one or more heuristics to determine whether the current or a particular location is, in fact, a physical/geographic location at which the end-user may or does have IoT products that may need to be registered to the end-user, through a learning process.

In addition to the above, FIG. 7 introduces new functionality at block 737. The method of FIG. 7 enters block 737 after completing the functionality of block 735 of FIG. 7, which may correspond to the functionality of block 335 of FIG. 3, of block 535 of FIG. 5, and block 635 of FIG. 6, described above. Upon performing the actions of block 737 of FIG. 7, the IoT application may add the geographic/physical location of any IoT product(s) discovered at the current geographic location to a list of IoT products of the end-user, and may add the current geographic/physical location to a list of locations associated with the end-user, if the end-user has chosen to register any IoT products discovered at the current geographic/physical location. The method may then proceed to block 705, whose functionality may correspond to that of block 305 of FIG. 3, block 505 of FIG. 5, and block 605 of FIG. 6, described above. It should be noted that the action of block 701 may also be repeated, at a regular or irregular interval of time, to determine whether a scan for compatible IoT products should be performed.

Figure 8:
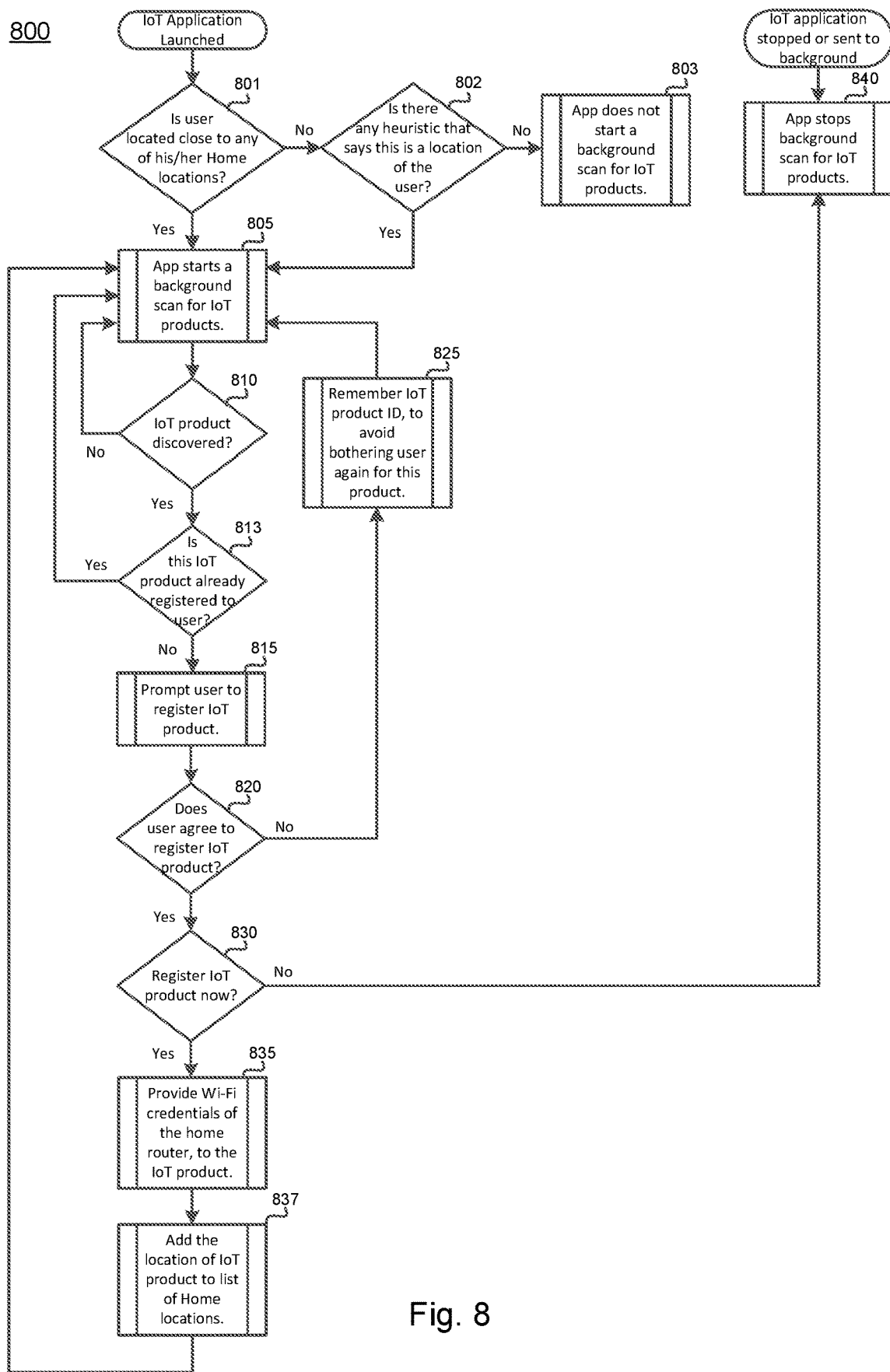
FIG. 8 shows a flowchart illustrating the actions of another example method of using an IoT application of an end-user device to scan for, connect to, and register an IoT product/device with an IoT system, in accordance with aspects of the present disclosure.

FIG. 8 shows a flowchart illustrating the actions of another example method of using an IoT application of an end-user device to scan for, connect to, and register an IoT product/device with an IoT system, in accordance with aspects of the present disclosure. The method illustrated in FIG. 8 is similar in many respects to the methods shown in FIGS. 3, 5, 6, and 7, and the sequence of the actions of the blocks of FIG. 8 may, for the most part, correspond to the sequence of actions of blocks 305-340 of FIG. 3, of blocks 501-540 of FIG. 5, of blocks 601-640 of FIG. 6, and of blocks 701-740 of FIG. 7. The method of FIG. 8 begins at block 801. There are some differences in FIG. 8 from the example embodiments discussed above, in particular, the additional actions of block 813, which are described below.

Upon entering block 813 of FIG. 8, the IoT application running on the end-user device has discovered an IoT product as a result of scanning for the presence of RF signals transmitted by any IoT products within wireless communication range of the end-user device. In the illustration of FIG. 8, the concepts described above with respect to FIGS. 2-7 are further enhanced so that the IoT application does not prompt the end-user when the method of FIG. 8 determines that an IoT product that is already registered to the end-user has been discovered in the vicinity of the end-user device. In accordance with aspects of the present disclosure, an IoT product that has already been registered to the end-user may be discovered by the IoT application because, for example, the IoT product may have temporarily lost connection with the Internet or because the IoT product suffered a malfunction. If, at block 813 of FIG. 8, the IoT application determines that an IoT product just discovered (by the scanning of the RF spectrum in which the IoT products operate in "soft AP mode") is already registered with/known to the IoT application (and, therefore, possible also to an IoT system based on communication of the IoT product with the IoT system following discovery), the method of FIG. 8 may ignore the discovery, and continue scanning for IoT products at block 805. In this manner, the end-user is not bothered by the IoT application with notifications for IoT products already known to the IoT application, which may have been previously registered with a compatible IoT system.

It should be noted that, in accordance with aspects of the present disclosure, the methods of FIGS. 3, 5, 6, 7, and 8 may be further enhanced so that the IoT application does not prompt the end-user when an IoT product that the end-user had previously indicated is to be ignored, is again discovered in the vicinity of the end-user device running the IoT application.

FIG. 9 shows a flowchart that illustrates actions of an example method by which an IoT application may scan for IoT products within RF communication range, even when the application is running in the background, in accordance with various aspects of the present disclosure. Such background scanning may, for example, begin and proceed without direct knowledge of the end-user, on an "CPU resource-available" basis, may be performed at a frequency/periodicity so as not to significantly impact the battery life of the end-user device running the IoT application, and may depend on whether the end-user device is operating from a battery power source. A "significant impact" to life of the battery of an end-user device may, for example, be a shortening of operation of the end-user device of at least 10%, or of at least 20%, of at least 30%, or another suitable amount. In accordance with various aspects of the present disclosure, the end-user may be enabled, through one or more elements of a user interface, to set the allowable impact upon battery life of the use of background RF scanning for IoT devices.

In accordance with aspects of the present disclosure, when at least one IoT product is discovered within RF wireless communication range of the end-user device running the IoT application, the IoT application may notify the end-user of such using one of multiple prior art mechanisms such as, for example, a mobile push notification. In accordance with various aspects of the present disclosure, the IoT application may perform the scan for nearby IoT products in the background, on the end-user device, and such mobile push notifications may be sent using technologies such as, for example, Apple Push Notification System (APNS) or Android Push Notification (APN). The IoT service that receives mobile push notification may, for example, be located on the same network element (i.e., at the end-user device), or may be located at a network element separate and remote from the end-user device. The end-user may then select whether he/she wants to register the IoT product. The following discussion of the method of FIG. 9 may refer to elements of FIG. 4. The actions of the method begin at block 902.

At block 902, the method may determine whether the end user device is geographically/physically (e.g., latitude/longitude) located within a certain threshold distance of any locations associated with the end-user. The geographic/physical location of the end-user device running the IoT application may be determined as previously described hereinabove. If the method determines that no locations associated with the end-user are known to the IoT application, or if the method determines that the end user device is not geographically/physically (e.g., latitude/longitude) located within a certain threshold distance of any locations associated with the end-user that are known to the end-user device running the IoT application, the method may loop back to block 902, as energy/battery capacity and CPU resources permit. If, however, the method determines that one or more locations associated with the end-user are known to the IoT application, and if the method determines that the end user device is geographically/physically (e.g., latitude/longitude) located within a certain threshold distance of at least one location associated with the end-user, then the end-user device running the IoT application may proceed to the actions of block 904.

At block 904, the method may scan the RF spectrum in use by the IoT products that are compatible with the IoT application running on the end-user device. Such a scan may be perform periodically (e.g., every 200 milliseconds (ms), every 500 ms, every second, every X seconds, every X minutes, where X is a numeric value, etc.). Then, at block 906, the method of FIG. 9 may determine whether any IoT product has been discovered by the scan. If no IoT product has been discovered by the scan, the method may, for example, repeat scanning according to the desired periodicity or the availability of CPU resource, by returning to block 904. If, however, at least one IoT product is discovered, the method may then, at block 908, send a notification, to what is referred to herein as an IoT service, about the IoT product discovered for the end-user, and may continue at block 910, where the method may receive notification of the discovered compatible IoT product from the IoT service, or a proxy thereof, and may display notice of the discovery on the device of the end-user. In accordance with various aspects of the present disclosure, the method of FIG. 9 may, for example, repeat steps 902 through 910 according to user interface settings of the end-user in regards to impact upon battery life and CPU resource usage.

In accordance with some aspects of the present disclosure, a mobile application such as the IoT application running on the end-user device may not be permitted to have certain required permissions and/or may not have access to particular resources and may, therefore, not be able to perform all of the functions that may be needed by the IoT application to directly notify the end-user of various things. To avoid those issues, the IoT application may employ an IoT service as shown in FIG. 10, described below, to perform the functionality shown in FIG. 9 as being performed by an IoT service, without departing from the spirit and scope of the present disclosure. As previously described above, the functionality of the IoT service may be located in the end-user device, or may be located in a network element separate from the end-user device.

FIG. 10 is a flowchart illustrating an example method of operating an IoT service of an end-user device, in accordance with various aspects of the present disclosure. The IoT service of the method of FIG. 10 may correspond, for example, to the IoT service discussed above with regard to the background functionality of the IoT application described above with regard to FIG. 9. The following discussion of FIG. 10 may make reference to the elements of any of FIGS. 1-9. The operation of the IoT service of FIG. 10 begins at block 1010.

At block 1010, the method may receive from an IoT application, a request for service and information regarding a new IoT product and an end-user of the IoT application. The IoT application and IoT product may, for example, be as described above with regard to IoT applications and IoT products discussed of FIGS. 2-9. The information regarding the new IoT product may be an indicator (e.g., a universally unique identifier (UUID)) some or all of which identifies a specific service being provided by the IoT product that broadcast the advertisement including, for example, data specific to the manufacturer of the IoT product such as data that identifies the manufacturer of the IoT product, that identifies the IoT Product model, that identifies the IoT product hardware and/or software version, and/or a serial number of the IoT product. The information regarding the end-user may comprise, for example, an end-user ID, an identifier of an end-user device, or other suitable identifier of an end-user to be associated with the new IoT product.

Next, at block 1012, the method may determine whether the new IoT product is already registered to the identified end-user. In accordance with aspects of the present disclosure, this functionality of FIG. 10 may be performed by the IoT service, or by the IoT application, as shown in FIG. 8. If the method determines, at block 1012, that the new IoT product is already registered to the identified end-user, the method may then proceed to block 1014, where the IoT service may take no action, ending the method of FIG. 10. If, however, it is determined at block 1012, that the new IoT product is not currently registered to the identified end-user, the method may then proceed to block 1016, where the method may notify the IoT application that uses the IoT service that the new IoT product is available to be registered to the end-user. The method of FIG. 10 may then be completed with regard to the received request for service.

In accordance with various aspects of the present disclosure, the above concepts illustrated in FIGS. 9 and 10 may be further enhanced so that the IoT application may perform a scan of RF spectrum only when the end-user device running the IoT application is within a certain physical distance of a geographic/physical location associated with the end-user. In this way, this enhancement may further reduce the impact on the operating life/capacity of a battery used for operation of an end-user device running the IoT application. It should be noted that functional characteristics/actions described above and illustrated in FIGS. 2-8 may be applied to further enhance the operation of the approach illustrated in FIGS. 9 and 10.

Figure 11:
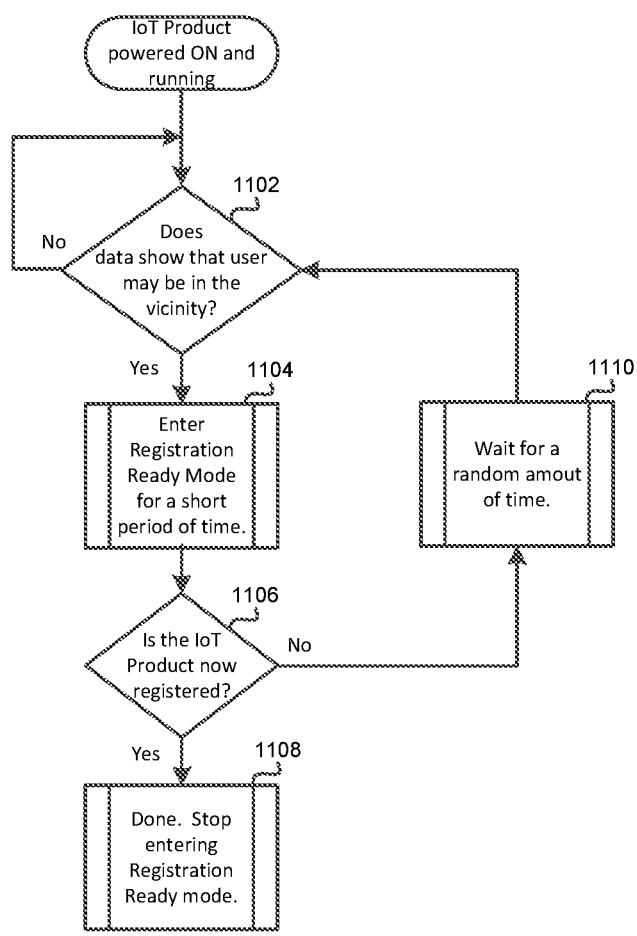
FIG. 11 shows a flowchart illustrating another example method of feature operation of an IoT product, in accordance with various aspects of the present disclosure.

FIG. 11 shows a flowchart illustrating another example method of feature operation of an IoT product, in accordance with various aspects of the present disclosure. The actions of FIG. 11 apply to a situation in which an IoT product may not be ready to perform registration until an end-user takes a certain action. In accordance with aspects of the present disclosure, an unregistered IoT product may enter into a mode of operation in which the IoT product is enabled to perform registration in a pseudo-random manner, so as to be discovered by nearby IoT applications. Such pseudo-random enabling of an IoT product operating mode in which registration is enabled may, for example, be defined based upon a pattern of availability of the end-user that is learned by the IoT product using information from sensors, end-user or manufacturer configuration, end-user activity while at a particular IoT product location versus being away from the particular IoT product location, etc. The actions of the example method of FIG. 11 begin at block 1102.

At block 1102, the method may determine whether the IoT product has detected the presence or activities of an end-user within a certain physical distance or within a certain RF communication range of the IoT product. This may be detected by the IoT product by, for example, detecting activity (e.g., signals and/or messaging) in particular RF spectrum used by the IoT product and/or the IoT application to produce detectable signals of activity of the end-user. Depending upon the nature and operating location in relation to any end-users that may be present, detection of the presence of an end-user may also be done using, for example, passive (e.g., infrared (IR)) or active (e.g., microwave RF) motion detectors, vibration detectors, sound detectors, etc. If the method determines, at block 1102, that an end-user is not currently detected (e.g., within a certain physical distance, within a certain RF communication range, or in the vicinity of the IoT product, the method may loop back upon block 1102, and continue monitoring for end-user activity. If, however, the method determines, at block 1102, that an end-user may be within a certain physical distance or within a certain RF communication range of the IoT product, the method may continue at block 1104.

At block 1104, the IoT product may enter what is referred to herein as "registration ready mode" for a brief period of time. Such a brief period of time may be, for example, 200 ms, 500 ms, 1 second, 2 seconds, 10 seconds, one minute, or X minutes, where X is a numeric value representing an amount of time during which an end-user may reasonably pass within a certain physical distance or be within a certain RF communication range of the IoT product while moving about a geographic or physical location associated with the end-user (e.g., a home or business).

Next, at block 1106, the method may determine whether, during the brief period of time in which the IoT product was in the "registration ready mode," the IoT product was registered by an IoT application of an end-user device. If, at block 1106, the method determines that the IoT product did undergo registration during the most recent "registration ready mode" period of time, the method of FIG. 11 may then proceed to block 1108, where the method stops entering "registration ready mode" because registration of the IoT product has already been completed. If, however, at block 1106, the method determines that the IoT product did not undergo registration during the most recent "registration ready mode" period of time, the method of FIG. 11 may then proceed to block 1110, where the method may direct the IoT product to wait for a random amount of time before proceeding back to block 1102 to again attempt to detect the presence or activities of an end-user within a certain physical distance or within a certain RF communication range of the IoT product.

Various aspects of the present disclosure may be found in a method of automatically associating an Internet addressable endpoint device of an end-user with an account of the end-user at a remote system supporting a plurality of Internet addressable endpoint devices. Each Internet addressable endpoint device may be associated with a respective end-user, where each end-user may have a respective wireless personal communication device. Such a method may comprise setting the Internet addressable endpoint device in a first mode of operation. The first mode of operation may comprise transmitting a radio frequency signal representative of a wireless access point of a wireless network, where the signal may be configured for communication with the personal communication device of the end-user and comprising information identifying the access point as originating from the Internet addressable endpoint device. The first mode of operation may also comprise receiving, from a software application running on the personal communication device of the end-user, information identifying the end-user and information comprising a set of access parameters that enable the personal communication device of the end-user to wirelessly establish communication with the remote system via an Internet gateway device at a physical location associated with the end-user. The method may also comprise, after receiving the information identifying the end-user and the set of access parameters, setting the Internet addressable endpoint device in a second mode of operation. The second mode of operation may comprise stopping transmission of the radio frequency signal representative of a wireless access point of a wireless network. The second mode of operation may also comprise wirelessly establishing communication with the remote system via the Internet gateway device using the set of access parameters received from the personal communication device of the end-user, and registering the Internet addressable endpoint device of the end-user with the remote system via the Internet gateway device, using the information identifying the end-user and information identifying the Internet addressable endpoint device.

In accordance with aspects of the present disclosure, the signal representative of the wireless access point may comprise an identifier portion comprising a predefined data value known to the software application running on the personal communication device of the end-user. The predefined data value of the identifier portion may comprise a certain sequence of characters that identifies the Internet addressable endpoint device. The Internet addressable endpoint device, if not yet registered, may use detection of motion of the end-user or RF signals from the device of the end-user to learn a pattern of availability of the end-user that may be used to cause setting the Internet addressable endpoint device in the first mode of operation. The Internet gateway device may comprise a wireless Internet router supporting a second wireless network. The software application running on the personal communication device of the end-user may enable reception of the radio frequency signal representative of the wireless access point only when the end-user device is determined to be within a certain physical distance of a physical location associated with the end-user. The Internet addressable endpoint device, when in the first mode of operation, may not route information between wireless networks.

Additional aspects of the present disclosure may be found in a non-transitory computer readable medium having stored thereon a plurality of code sections, where each code section comprises a plurality of instructions executable by one or more processors to cause the one or more processors to perform steps of the method described above.

Further aspects of the present disclosure may be observed in a system for use in an Internet addressable endpoint device, where the system comprises one or more processors operably coupled to at least one wireless communication interface configured to wirelessly communicate with a personal communication device of an end-user and to an Internet gateway device. The one or more processors may be operable to, at least, perform the steps of the method described above.

Although devices, methods, and systems according to the present disclosure may have been described in connection with a preferred embodiment, it is not intended to be limited to the specific form set forth herein, but on the contrary, it is intended to cover such alternative, modifications, and equivalents, as can be reasonably included within the scope of this disclosure and appended diagrams.

Accordingly, various aspects of the present disclosure may be realized in hardware, software, or a combination of hardware and software. Aspects of the present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Various aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While various aspects of the present disclosure have been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, the system comprising:
   an Internet of Things (IoT) device comprising:
   a transceiver operable to communicate with a mobile phone of an end-user and to an Internet gateway device; and
   a processor operably coupled to the transceiver, wherein the processor is operable to:

register the IoT device with a remote system via the Internet gateway device using information identifying the end-user and information identifying the IoT device,
    determine a pattern of availability of the end-user,
    enable the IoT device to communicate with the mobile phone of the end-user according to the pattern of availability of the end-user, and
    direct the IoT device to wait a random amount of time, if the IoT device has not registered with the remote system, before the IoT device attempts to detect activities of the end-user within a predetermined distance.

2. The system of claim 1, wherein the communication with the mobile phone of the end-user comprises:
    transmitting a signal representative of a wireless access point of a wireless network, wherein the signal comprises information identifying the access point as originating from the IoT device, and
    receiving, from a software application running on the mobile phone of the end-user, a set of access parameters that enable the IoT device to wirelessly establish communication with the remote system via the Internet gateway device at a physical location associated with the end-user.

3. The system according to claim 2, wherein the signal representative of the wireless access point comprises an identifier portion comprising a predefined data value known to the software application running on the mobile phone of the end-user.

4. The system according to claim 3, wherein the predefined data value of the identifier portion comprises a certain sequence of characters that identifies the IoT device.

5. The system according to claim 1, wherein the IoT device, if not yet registered, uses detection of motion of the end-user or RF signals from the mobile phone of the end-user to determine the pattern of availability of the end-user.

6. The system according to claim 1, wherein the software application running on the mobile phone of the end-user enables reception of the radio frequency signal representative of the wireless access point only when the end-user device is determined to be within a certain physical distance of a physical location associated with the end-user.

7. The system according to claim 1, wherein the IoT device is operable to route information between wireless networks.

8. A method, the method comprising:
    registering an Internet of Things (IoT) device with a remote system via an Internet gateway device using information identifying an end-user and information identifying the IoT device;
    determining a pattern of availability of the end-user;
    enabling the IoT device to communicate with a mobile phone of the end-user according to the pattern of availability of the end-user; and
    directing the IoT device to wait a random amount of time, if the IoT device has not registered with the remote system, before the IoT device attempts to detect activities of the end-user within a predetermined distance.

9. The method of claim 8, wherein the communication with the mobile phone of the end-user comprises:
    transmitting a signal representative of a wireless access point of a wireless network, wherein the signal comprises information identifying the access point as originating from the IoT device, and
    receiving, from a software application running on the mobile phone of the end-user, a set of access parameters that enable the IoT device to wirelessly establish communication with the remote method via the Internet gateway device at a physical location associated with the end-user.

10. The method according to claim 9, wherein the signal representative of the wireless access point comprises an identifier portion comprising a predefined data value known to the software application running on the mobile phone of the end-user.

11. The method according to claim 10, wherein the predefined data value of the identifier portion comprises a certain sequence of characters that identifies the IoT device.

12. The method according to claim 8, wherein the IoT device, if not yet registered, uses detection of motion of the end-user or RF signals from the mobile phone of the end-user to determine the pattern of availability of the end-user.

13. The method according to claim 8, wherein the software application running on the mobile phone of the end-user enables reception of the radio frequency signal representative of the wireless access point only when the end-user device is determined to be within a certain physical distance of a physical location associated with the end-user.

14. The method according to claim 8, wherein the IoT device is operable to route information between wireless networks.

15. A non-transitory computer readable medium having stored thereon a plurality of code sections, each code section comprising a plurality of instructions executable by one or more processors to cause the one or more processors to perform a method, the method comprising:
    registering an Internet of Things (IoT) device with a remote system via an Internet gateway device using information identifying an end-user and information identifying the IoT device;
    determining a pattern of availability of the end-user;
    enabling the IoT device to communicate with a mobile phone of the end-user according to the pattern of availability of the end-user; and
    directing the IoT device to wait a random amount of time, if the IoT device has not registered with the remote system, before the IoT device attempts to detect activities of the end-user within a predetermined distance.

16. The method according to claim 15,
    transmitting a signal representative of a wireless access point of a wireless network, wherein the signal comprises information identifying the access point as originating from the IoT device, and
    receiving, from a software application running on the mobile phone of the end-user, a set of access parameters that enable the IoT device to wirelessly establish communication with the remote method via the Internet gateway device at a physical location associated with the end-user.

17. The method according to claim 16, wherein the signal representative of the wireless access point comprises an identifier portion comprising a predefined data value known to the software application running on the mobile phone of the end-user.

18. The method according to claim 17, wherein the predefined data value of the identifier portion comprises a certain sequence of characters that identifies the IoT device.

19. The method according to claim 15, wherein the IoT device, if not yet registered, uses detection of motion of the end-user or RF signals from the mobile phone of the end-user to determine the pattern of availability of the end-user.

20. The method according to claim 15, wherein the software application running on the mobile phone of the end-user enables reception of the radio frequency signal representative of the wireless access point only when the end-user device is determined to be within a certain physical distance of a physical location associated with the end-user.

21. The method according to claim 15, wherein the IoT device is operable to route information between wireless networks.

\* \* \* \* \*